Feb. 16, 1932.   W. E. HOLLAND   1,845,047
ELECTROLYTIC CELL AND MOUNTING THEREFOR
Filed Oct. 15, 1925   2 Sheets-Sheet 1

Inventor-
Walter E. Holland,
by his Attorneys,-
Howson & Howson

Feb. 16, 1932.  W. E. HOLLAND  1,845,047
ELECTROLYTIC CELL AND MOUNTING THEREFOR
Filed Oct. 15, 1925  2 Sheets-Sheet 2
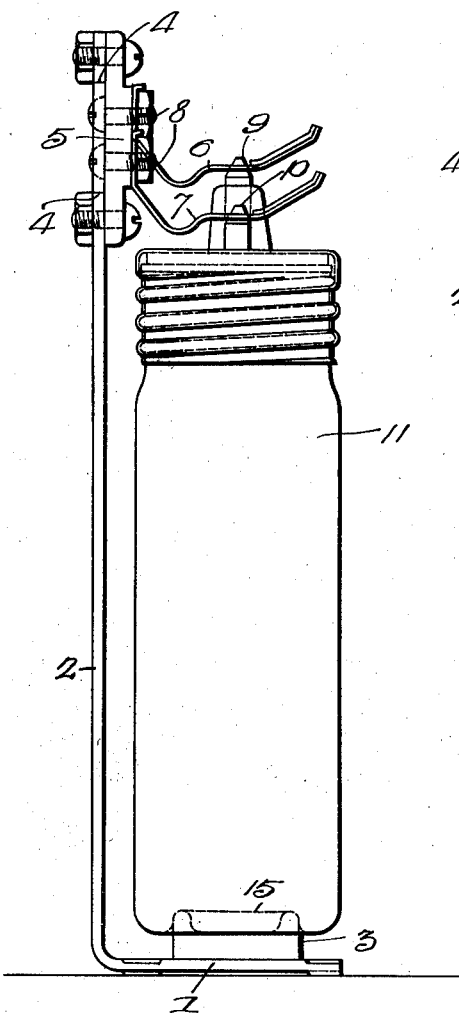
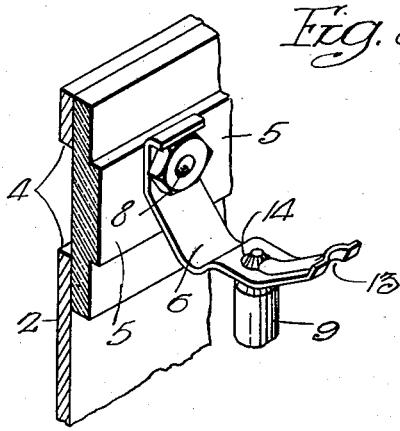
Inventor:-
Walter E. Holland.
by his Attorneys.-
Howson & Howson Patented Feb. 16, 1932

1,845,047

UNITED STATES PATENT OFFICE

WALTER E. HOLLAND, OF PHILADELPHIA, PENNSYLVANIA, ASSIGNOR TO PHILADELPHIA STORAGE BATTERY COMPANY, OF PHILADELPHIA, PENNSYLVANIA, A CORPORATION OF PENNSYLVANIA

ELECTROLYTIC CELL AND MOUNTING THEREFOR

Application filed October 15, 1925. Serial No. 62,606.

This invention relates to electrolytic cells and more particularly to the terminals of and mountings for rectifier and battery cells.

The principal object of the invention is to provide a novel combination of terminals and mounting providing for quick and easy insertion and removal of the cell, and in which the cell is properly connected to the electrical circuit and firmly held.

Another object is to provide a mounting in which the securing means is constituted by the same elements that function as the contactors or terminal-engaging parts.

A further object of the invention is to provide a mounting in which the cell clamping means consists of resilient terminal-engaging elements which are retained in terminal-gripping position by their own resiliency.

A still further object of the invention is to provide resilient terminal-engaging retaining elements so formed as automatically to receive and grip the cell terminals as the cell is moved to a normal position in the mount.

The invention further contemplates the provision of a novel arrangement of contactors or terminal-engaging elements adapted in conjunction with correspondingly and differentially arranged cell terminals to prevent connection of the cell in the mount except in the proper position as regards cathode and anode.

The invention also resides in the provision of novel bottom retaining and insulating means for the cell.

These and other useful ends are obtained as hereinafter described by means of the novel construction illustrated in the attached drawings, in which:

Fig. 2 is a side elevation of the same, and

Fig. 3 is a view in perspective of one of the terminal-engaging elements.

Figure 1:
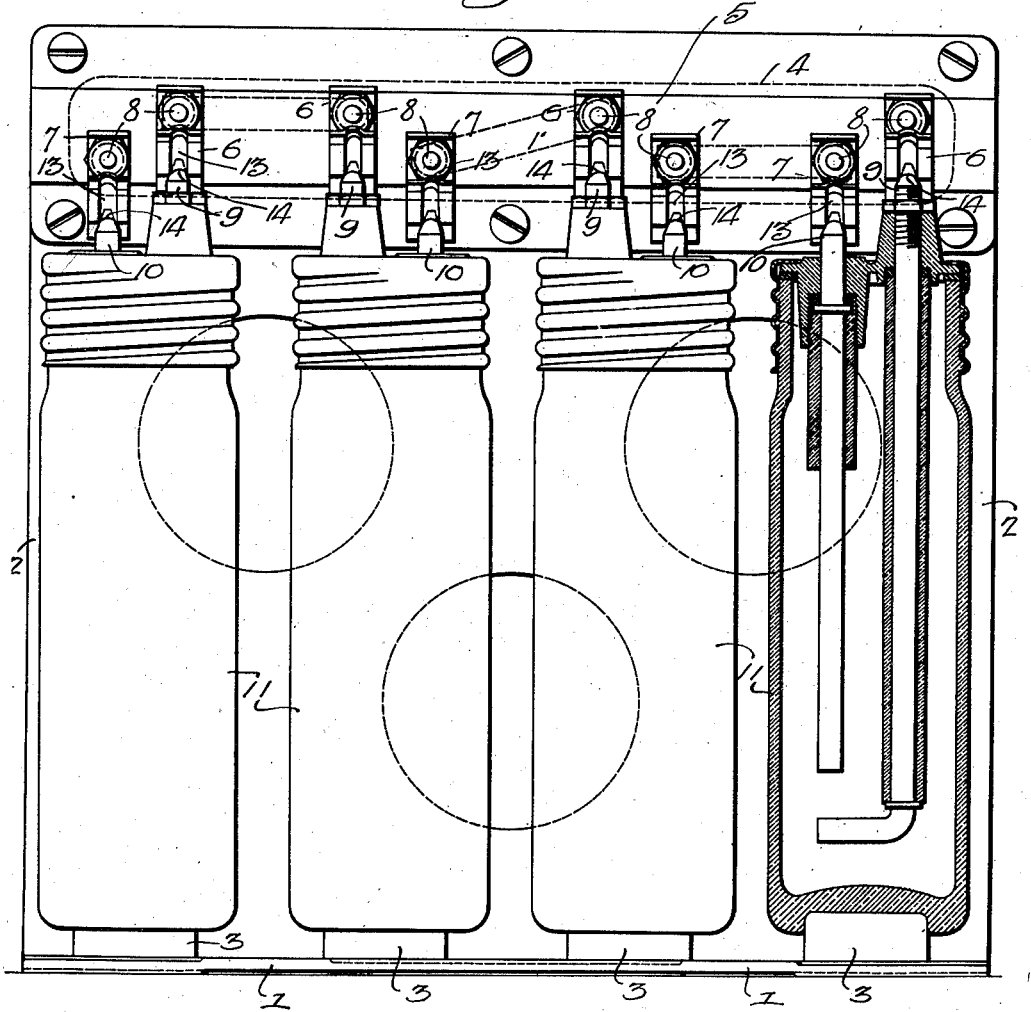
Figure 1 is a front elevational view, partially in section, of cells in a multiple mount made in accordance with this invention.

With reference to the drawings, the mount comprises a cell-supporting frame including a base 1 and back 2. In a preferred form, the frame may consist of an integral piece of sheet metal. Secured in suitable manner to the base 1 is a cell supporting pad 3 which preferably should be of insulating material and which in the present instance is circular in form. Where cushioning of the cell is desired, the pad 3 may be made of soft rubber.

At the top of the back 2 is an aperture 4 and removably secured over the aperture to the forward face of the back is a plate 5 of hard rubber, bakelite or other suitable insulating material. The plate 5 constitutes a panel support for a pair of contactor elements 6 and 7 in the form of resilient clips, which may be secured to the panel by bolts 8 or other suitable securing means. In the present instance, the bolts constitute means for connecting electrical conductors to the contactor clips.

As clearly illustrated, the clip 6 is secured to the panel at a point higher than the clip 7, the clips thereby being adapted to engage respectively the projecting tops of the electrodes 9 and 10 of the cell 11, which electrodes project to different heights above the top of the cell 11. The arrangement is such as to preclude the possibility of the electrodes or cell terminals being reversed as regards the clips with which they are intended to be engaged. A general description of the cell 11 is here unnecessary since it constitutes the subject matter of a co-pending application, Ser. No. 69,830, filed November 18, 1925, (now Patent No. 1,707,857, granted April 2, 1929). My invention, therefore, in its broader features is not limited to the specific constructional details of the cell 11.

It will be noted that the outer ends of the clips are slightly upturned, and each is preferably provided on its nether side with a groove 13 extending from the outer end longitudinally to an aperture 14 into which the upper ends of the electrodes 9 and 10 are adapted to fit.

The cell 11 is provided in its bottom with a recess 15 into which the pad 3 is adapted to fit, the pad being thicker than the depth of the recess so that the cell is supported above the base 1 and upon the pad. Obviously, the pad, in addition to supporting the cell, prevents lateral displacement of the bottom of the cell from a normal position and insulates the bottom of the cell from the base.

In inserting the cell in the mount, it is first placed upon the pad 3 with the high and low cell terminals in a position corresponding with the high and low contactors, and then pushed in at the top until the cell terminals engage in the outer ends of the grooves 13 of the respective clips. Continued pressure forces the top of the cell toward the back, the tips of the electrodes moving along the guide grooves 13 and the clips 6 and 7 being flexed upwardly until the tips of the terminals lodge in the apertures 14 in which they are retained by the downward pressure of the clips, good electrical contact being established between the respective terminals and contactor clips. Release of the cell is accomplished by flexing the clips upwardly to an extent freeing the electrodes from the apertures.

Obviously, there may be considerable modification without departure from the essential features of the invention.

I claim:

1. The combination with an electrolytic cell including terminal posts projecting at the top, of a support for the cell, and a pair of contact elements in the form of flat resilient and transversely projecting strips each having a substantially horizontal portion, in which is formed an aperture for reception respectively of the tips of the terminal posts, and having also an outer portion inclined upwardly from said apertured horizontal part and formed in its under side with a longitudinal groove terminating in the said aperture.

2. The combination with an electrolytic cell including terminal posts projecting at the top, of a support for the cell, and a pair of contact elements in the form of flat resilient and transversely projecting strips each having a substantially horizontal portion, in which is formed an aperture for reception respectively of the tips of the terminal posts, and having also an outer portion inclined upwardly from said apertured horizontal part and formed in its under side with a longitudinal groove terminating in the said aperture, the outer extremities of the said contact strips projecting normally to a point higher than the tips of the terminal posts when the bottom of the cell engages said support.

3. The combination with an electrolytic cell including terminal posts projecting above the top thereof and having their upper extremities tapered, of a support for said cell, and means for clamping the cell on the support including a pair of resilient metallic elements projecting transversely and bearing resiliently upon the tops of said terminal posts, each of said elements having an aperture smaller in diameter than the said posts and adapted to receive the tapered ends of the latter.

4. The combination with an electrolytic cell including terminal posts projecting at the top, of a support for the cell, and a pair of vertically resilient contact elements secured to the support and each having an aperture adapted respectively for reception of the tops of the said posts, together with a guide groove in the under side terminating at its inner end in said aperture and extending upwardly and outwardly towards the extremities of said contact elements.

5. The combination with an electrolytic cell including terminal posts projecting to different heights above the top thereof, of a support including a base member upon which the cell is seated, and a pair of substantially horizontal metallic elements adapted to resiliently engage and retain the tops of said posts, said elements being resilient in substantially parallel vertical planes and having upwardly inclined extremities normally extending above the tops of the posts when the cell is seated on the base to thereby permit insertion of the cell to the retained position by pressure exerted on the cell following engagement of the posts under the said inclined extremities.

6. The combination with an electrolytic cell including terminal posts projecting to different heights above the top thereof, of a support including a base member upon which the cell is seated, and a pair of substantially horizontal metallic elements adapted to resiliently engage and retain the tops of said posts, said elements being resilient in substantially parallel vertical planes and having upwardly inclined extremities normally extending above the tops of the posts when the cell is seated on the base to thereby permit insertion of the cell to the retained position by pressure exerted on the cell following engagement of the posts under the said inclined extremities, and cell-positioning means on the base effective in any direction of movement of the cell to prevent displacement thereof until the said retaining elements are released.

7. The combination with an electrolytic cell including terminal posts projecting above the top thereof, of a support including a base member upon which the cell is seated, and a pair of substantially horizontal metallic elements adapted to resiliently engage and retain the tops of said posts, said elements being resilient in substantially vertical planes and having apertures for reception of the tips of the posts with a groove extending from an edge of the element into said aperture, said grooves being adapted for guiding the tops of the posts into the apertures.

8. The combination with an electrolytic cell including terminal posts projecting above the top thereof, of a support including a base member upon which the cell is seated, and a pair of substantially horizontal metallic elements adapted to resiliently engage and retain the tops of said posts, said elements being resilient in substantially vertical planes and having apertures for reception of the tips of the posts with a groove extending from an edge of the element into said aperture, said grooves being adapted for guiding the tops of the posts into the apertures, and means for preventing displacement of the bottom of the cell in all directions when the posts are engaged in said apertures.

WALTER E. HOLLAND.